US012700878B2

(12) United States Patent
    Pehlke

(10) Patent No.: US 12,700,878 B2
(45) Date of Patent: Aug. 4, 2026

(54) CONSOLIDATED FRONT-END ARCHITECTURE

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 533 days.

(21) Appl. No.: 18/053,279

(22) Filed: Nov. 7, 2022

(65) Prior Publication Data

US 2023/0146310 A1    May 11, 2023

Related U.S. Application Data

(60) Provisional application No. 63/276,997, filed on Nov. 8, 2021.

(51) Int. Cl.
    *H04B 1/00*     (2006.01)
    *H04W 84/12*    (2009.01)
    *H04W 88/06*    (2009.01)

(52) U.S. Cl.
    CPC ........... *H04B 1/0067* (2013.01); *H04W 84/12* (2013.01); *H04W 88/06* (2013.01)

(58) Field of Classification Search
    CPC ... H04B 1/0067; H04B 1/0057; H04W 84/12; H04W 88/06
    USPC ...................................................... 455/553.1
    See application file for complete search history.

(56) References Cited

U.S. PATENT DOCUMENTS

| | | | |
|---|---|---|---|
| 10,256,851 B2 | 4/2019 | Pehlke et al. | |
| 11,128,323 B2 | 9/2021 | Pehlke et al. | |
| 11,165,393 B2 | 11/2021 | Pehlke | |
| 11,374,538 B2 | 6/2022 | Drogi et al. | |
| 11,515,608 B2 | 11/2022 | Pehlke | |
| 2014/0235184 A1* | 8/2014 | Ichitsubo | H04B 1/0067 |
| | | | 455/101 |
| 2018/0063031 A1* | 3/2018 | Wloczysiak | H04B 1/0064 |
| 2019/0305903 A1* | 10/2019 | Badic | H04W 72/542 |
| 2020/0228159 A1 | 7/2020 | Raghavan et al. | |
| 2020/0366320 A1* | 11/2020 | An | H04B 1/44 |
| 2021/0098897 A1 | 4/2021 | Pehlke et al. | |
| 2021/0099199 A1* | 4/2021 | Pehlke | H04B 1/123 |
| 2021/0211145 A1 | 7/2021 | Loh et al. | |
| 2021/0218370 A1 | 7/2021 | Balteanu et al. | |

(Continued)

*Primary Examiner* — Huy C Ho

(74) *Attorney, Agent, or Firm* — Knobbe, Martens, Olson & Bear, LLP

(57) ABSTRACT

Embodiments relate to radio-frequency front-end configurations having a shared amplifier network. The front-end configuration includes a first signal path configured to provide a first radio-frequency signal, a second signal path configured to provide a second radio-frequency signal, and a shared amplifier network that forms at least part of the first signal path and the second signal path. The shared amplifier network comprises a low noise amplifier configured to amplify received first or second radio-frequency signals and a power amplifier configured to amplify first or second radio-frequency signals for transmitting by an antenna. Related radio-frequency modules, wireless devices and methods for simultaneously transmitting and receiving a first radio-frequency signal and a second radio-frequency signal are also provided.

17 Claims, 7 Drawing Sheets

(56)      References Cited

U.S. PATENT DOCUMENTS

| | | | |
|---|---|---|---|
| 2022/0014153 | A1 | 1/2022 | Pehlke |
| 2022/0069846 | A1 | 3/2022 | Loh et al. |
| 2022/0069850 | A1 | 3/2022 | Loh et al. |
| 2022/0103192 | A1 | 3/2022 | Pehlke |
| 2022/0103193 | A1 | 3/2022 | Pehlke |
| 2022/0110064 | A1 | 4/2022 | Pehlke |
| 2022/0182084 | A1 | 6/2022 | King et al. |
| 2022/0182085 | A1 | 6/2022 | King et al. |
| 2022/0217028 | A1 | 7/2022 | Pehlke |
| 2022/0231710 | A1 | 7/2022 | Pehlke |
| 2022/0247365 | A1 | 8/2022 | Pehlke et al. |
| 2022/0286093 | A1 | 9/2022 | Drogi et al. |
| 2022/0294400 | A1 | 9/2022 | Cao et al. |
| 2022/0294486 | A1 | 9/2022 | Cao et al. |
| 2022/0320751 | A1 | 10/2022 | Pehlke et al. |
| 2022/0328980 | A1 | 10/2022 | Dicarlo et al. |
| 2022/0329268 | A1 | 10/2022 | Pehlke |
| 2022/0329269 | A1 | 10/2022 | Pehlke |
| 2022/0329270 | A1 | 10/2022 | Pehlke et al. |
| 2022/0329273 | A1 | 10/2022 | Pehlke |
| 2022/0385331 | A1 | 12/2022 | Balteanu et al. |
| 2022/0416837 | A1 | 12/2022 | Raghavan et al. |

* cited by examiner

<u>FIG.3</u>

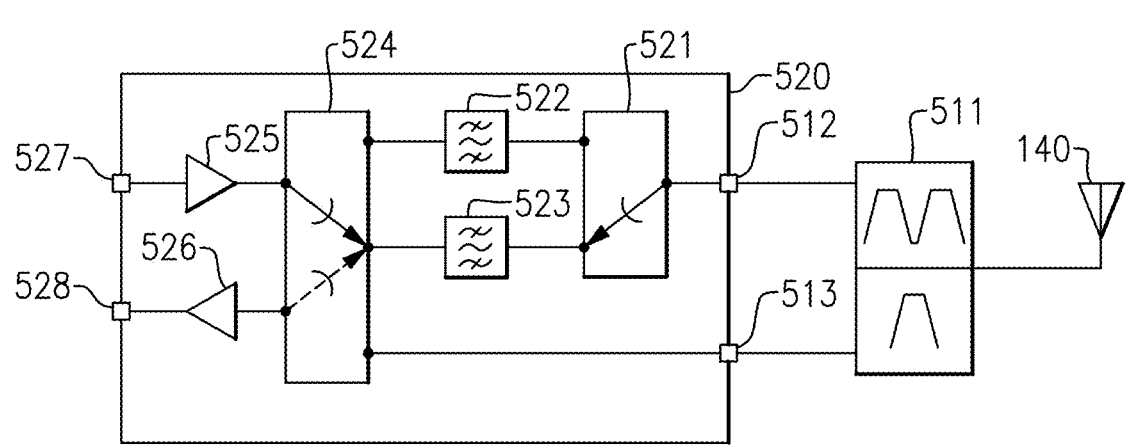
FIG.5

CONSOLIDATED FRONT-END ARCHITECTURE

CROSS-REFERENCE TO RELATED APPLICATIONS

This application claims the benefit of priority under 35 U.S.C. § 119 of U.S. Provisional Patent Application No. 63/276,997, filed Nov. 8, 2021 and titled "CONSOLIDATED FRONT-END ARCHITECTURE," which is herein incorporated by reference in its entirety.

BACKGROUND

Field

Embodiments of the invention relate to electronic systems, and in particular, to radio frequency electronics.

Description of Related Technology

In wireless applications, wireless communication devices typically include components in a front-end module that are configured to condition (for instance, filter and/or amplify) received radio-frequency (RF) signals. The RF signals can be cellular signals, wireless local area network (WLAN) signals, or the like. The front-end module can be configured to direct these signals to appropriate antennas, filters, amplifiers, and/or downstream modules for processing.

Front-end modules can be used for transmitting and/or receiving signals of a wide range of frequencies. For example, a front-end modules can be used to wirelessly communicate RF signals in a frequency range of about 30 kHz to 300 GHz, such as in the range of about such as in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems with front-end modules include, but are not limited to, mobile phones, tablets, base stations, network access points, customer-premises equipment (CPE), laptops, and wearable electronics.

SUMMARY

According to one embodiment there is provided a radio-frequency front-end configuration having a shared amplifier network, the front-end configuration comprising a first signal path configured to provide a cellular radio-frequency signal, a second signal path configured to provide a Wi-Fi radio-frequency signal, and a shared amplifier network that forms at least part of the first signal path and the second signal path, the shared amplifier network comprising a low noise amplifier configured to amplify the cellular and the Wi-Fi radio-frequency signals provided by the respective signal path and a power amplifier configured to amplify the cellular and the Wi-Fi radio-frequency signals provided by the respective signal path to an antenna.

One example further comprises a multiplexer configured to provide the cellular radio-frequency signal from the antenna to the first signal path and configured to provide the Wi-Fi radio-frequency signal from the antenna to the second signal path.

Another example further comprises an antenna switch module for selecting between a first radio-frequency band of the cellular radio-frequency signal and a second radio-frequency band of the cellular radio-frequency signal.

In one example the first signal path includes a first band pass filter configured to pass cellular radio-frequency signals in a first radio-frequency band, and wherein the second signal path includes a second band pass filter configured to pass cellular radio-frequency signals in a second radio-frequency band.

In one example the cellular frequency range is separated from the Wi-Fi frequency range by a frequency gap that is smaller than or equal to approximately 15 MHz, 13 MHz or 3 MHz.

In one example the Wi-Fi radio-frequency signal includes a frequency band for WLAN communication having a frequency range of between 2403 MHz to 2483 MHz, 5150 MHz to 5850 MHz, or 5925 MHz to 7125 MHz.

In one example the cellular radio-frequency signal includes frequencies between 2300 MHz to 2400 MHz and between 2496 MHz to 2690 MHz and the Wi-Fi radio-frequency signal includes frequencies between 2403 MHz to 2483 MHz.

In one example the cellular radio-frequency signal includes frequencies between 4400 MHz to 5000 MHz and the Wi-Fi radio-frequency signal includes frequencies between 5150 MHz to 5850 MHz.

In one example the cellular radio-frequency signal includes frequencies between 5855 MHz to 5925 MHz and the Wi-Fi radio-frequency signal includes frequencies between 5925 MHz to 7125 MHz.

In one example the first signal path includes a first filter configured to pass frequencies between 2300 MHz to 2400 MHz and a second filter configured to pass frequencies between 2496 MHz to 2690 MHz.

Another example further comprises a transmit/receive select switch configured to select either the low noise amplifier or the power amplifier for amplifying the first radio-frequency signal or the second radio-frequency signal.

In one example the first radio-frequency signal is provided via a first signal port and the second radio-frequency signal is provided via a second signal port.

According to another embodiment there is provided a radio-frequency module comprising a packaging substrate configured to receive a plurality of components, and a semiconductor die implemented on the packaging substrate, the semiconductor die including a front-end configuration comprising a first signal path configured to provide a cellular radio-frequency signal, a second signal path configured to provide a Wi-Fi radio-frequency signal, and a shared amplifier network that forms at least part of the first signal path and the second signal path, the shared amplifier network comprising a low noise amplifier configured to amplify the cellular and the Wi-Fi radio-frequency signals provided by the respective signal path and a power amplifier configured to amplify the cellular and the Wi-Fi radio-frequency signals provided by the respective signal path to an antenna.

In one example the radio-frequency module is a diversity receiver front-end configuration or a multi-input multi-output module.

Another example further comprises a multiplexing assembly.

According to another embodiment there is provided a wireless device comprising an antenna port coupled to one or more antennas, an antenna switch module, a radio-frequency module, the radio-frequency module including a front-end configuration comprising a first signal path configured to provide a cellular radio-frequency signal, a second signal path configured to provide a Wi-Fi radio-frequency signal, and a shared amplifier network that forms at least part of the first signal path and the second signal path, the shared amplifier network comprising a low noise amplifier configured to amplify the cellular and the Wi-Fi radio-frequency signals provided by the respective signal path and a power amplifier configured to amplify the cellular and the Wi-Fi radio-frequency signals provided by the respective signal path to an antenna, and a controller configured to provide a control signal to the switching circuit.

One example further comprises a controller for controlling a transmit/receive select switch to thereby coordinate the transmission and reception of the cellular and Wi-Fi radio-frequency signals.

According to another embodiment there is provided a method of coordinating the transmission and reception of a cellular radio-frequency signal and a Wi-Fi radio-frequency signal, the method comprising providing a shared amplifier network that forms at least part of a first signal path for providing a cellular radio-frequency signal and a second signal path for providing a Wi-Fi radio-frequency signal, the shared amplifier network including a low noise amplifier and a power amplifier, and controlling, with a controller, the reception or transmission of the cellular radio-frequency signal with the reception or transmission of the Wi-Fi radio-frequency signal to thereby enable the amplification of one of the cellular or Wi-Fi radio-frequency signals with the low noise amplifier and the amplification of the other of the cellular or Wi-Fi radio-frequency signals with the power amplifier.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

FIG. 5 is a schematic diagram of a front-end configuration according to one embodiment.

DETAILED DESCRIPTION OF EMBODIMENTS

Figure 1:
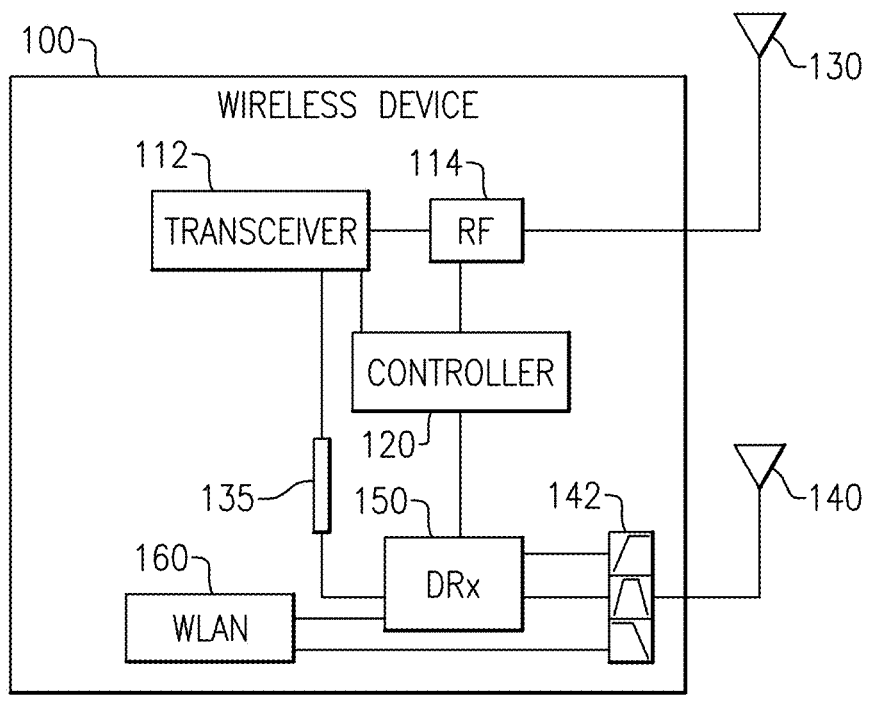
FIG. 1 is a schematic diagram of an example wireless device having a primary antenna and a diversity antenna.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Aspects and embodiments described herein are directed to a front-end configuration having consolidated radio frequency paths. This advantageously enables modules incorporating the front-end configuration to have a reduced printed circuit board (PCB) footprint, resulting in greater miniaturization and lower cost.

Typically, wireless communication frequencies can be divided into a low frequency band (e.g., approximately 698 MHz-approximately 960 MHz, LB), a middle frequency band (e.g., approximately 1427 MHz-approximately 2200 MHz, MB), a high frequency band (e.g., approximately 2300 MHz-approximately 2690 MHz, HB) and an ultrahigh frequency band (e.g., approximately 3400 MHz-approximately 3600 MHz, UHB). The frequency bands may be cellular frequency bands, such as UMTS (Universal Mobile Telecommunications System) frequency bands described below in Table 1, or other non-UMTS frequency bands.

TABLE 1

| Band | Mode | Tx Frequency Range (MHz) | Rx Frequency Range (MHz) |
|------|------|--------------------------|--------------------------|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |

US 12,700,878 B2

5

TABLE 1-continued

| Band | Mode | Tx Frequency Range (MHz) | Rx Frequency Range (MHz) |
|------|------|--------------------------|--------------------------|
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

The high frequency band includes, but is not limited to, Band 40 (B40), Band 30 (B30), Band 41 (B41) and Band 7 (B7), etc. B41 is used in time division duplexing (TDD) and thus has a single frequency band of approximately 2496 MHz to approximately 2690 MHz, which is utilized for both transmit (Tx) and receive (Rx) operations. Similarly, B40 is used in TDD and thus has a single frequency band of approximately 2300 MHz to approximately 2400 MHz. B41 and B40 can be utilized in cellular communications, e.g., 3rd generation partnership project (3GPP) wireless device. B7 is used in frequency division duplexing (FDD) and thus performs simultaneous Tx and Rx operations via different frequencies, for example, Tx (approximately 2500 MHz to approximately 2570 MHz) and Rx (approximately 2620 MHz to approximately 2690 MHz) paths. This is typically accomplished by the use of a duplexer, which combines the Tx and Rx paths into a common terminal, or signal port. B30 is also used in FDD and thus performs simultaneous Tx and Rx operations via different frequencies, for example, Tx (approximately 2305 MHz to approximately 2315 MHz) and Rx (approximately 2350 MHz to approximately 2360 MHz) paths.

The middle frequency band includes, but is not limited to, band 51 (B51) (e.g., approximately 1427 MHz-approximately 1432 MHz, TDD), band 74 (B74) (e.g., approximately 1427 MHz-approximately 1432 MHz and approximately 1475 MHz-approximately 1518 MHz, FDD), Band 65 (B65) (e.g., approximately 1920 MHz-approximately 2010 MHz and approximately 2110 MHz-approximately 2200 MHz, FDD) etc. The 2.4 GHz Wi-Fi band has a frequency range of approximately 2403 MHz to approximately 2483 (or approximately 2483.5) MHz, which lies between B40 and B41 and can be utilized in wireless local area network (WLAN).

Existing cellular front-end architecture designs are typically configured to maintain separate and independent radio frequency signal paths for each radio access technology (RAT) such as cellular and Wi-Fi. The reason for this is largely due to legacy implementations of transceivers and modems that need to be kept separate, which naturally led to the separation of cellular and Wi-Fi RATs in front-end modules. However, maintaining these two separate RF solutions in the front-end module results in a large printed circuit board (PCB) footprint and increased associated costs.

It would therefore be advantageous to be able to miniaturize front-end modules by consolidating aspects of the two RAT signal paths. However, in order to support both RATs the consolidated path must be capable of supporting, for example, the different waveforms, modulation orders, timing, gain flatness, and dynamic error vector magnitude (EVM) of each RAT.

FIG. 1 shows an example wireless device 100 having a primary antenna 130 and a diversity antenna 140. The wireless device 100 includes an RF module 114 and a cellular transceiver 112 that may be controlled by a controller 120. The RF module 114 may be referred to as a front-end module (FEM) due to the physical proximity between the primary antenna 130 and RF module 114 to reduce attenuation due to cable/line loss. The RF module 114 may perform processing on an RF receive signal received from the primary antenna 130 and/or and RF transmit signal from the cellular transceiver 112 for transmission via the primary antenna 130. To that end, the RF module 114 may include filters, power amplifiers, band select switches, matching circuits, and/or other components, as further described below.

In some embodiments, the primary antenna 130 and/or diversity antenna 140 are configured to receive signals within cellular frequency bands and wireless local area network (WLAN), also referred to herein as Wi-Fi, frequency bands. In such embodiments, the wireless device 100 can include one or more frequency multiplexers, such as multiplexer 142 coupled to the diversity antenna 140 that is configured to separate the diversity signal into different frequency ranges. The multiplexer 142 can also be referred to herein as an antenna-plexer. The multiplexer can be configured to include a low pass filter structure that passes a frequency range that includes low band cellular frequencies, a bandpass filter structure that passes a frequency range that includes low band WLAN signals and mid-band and high-band cellular signals, and a high pass filter structure that passes a frequency range that includes high-band WLAN signals. The controller 120 can be configured to control the DRx FEM 150 to selectively direct signals to suitable signal paths. The wireless device 100 also includes the WLAN transceiver 160 for processing WLAN signals.

In the example shown in FIG. 1, the diversity antenna 140 is coupled to the cellular transceiver 112 by a transmission line 135, such as a cable or a printed circuit board (PCB) trace.

Figure 2:
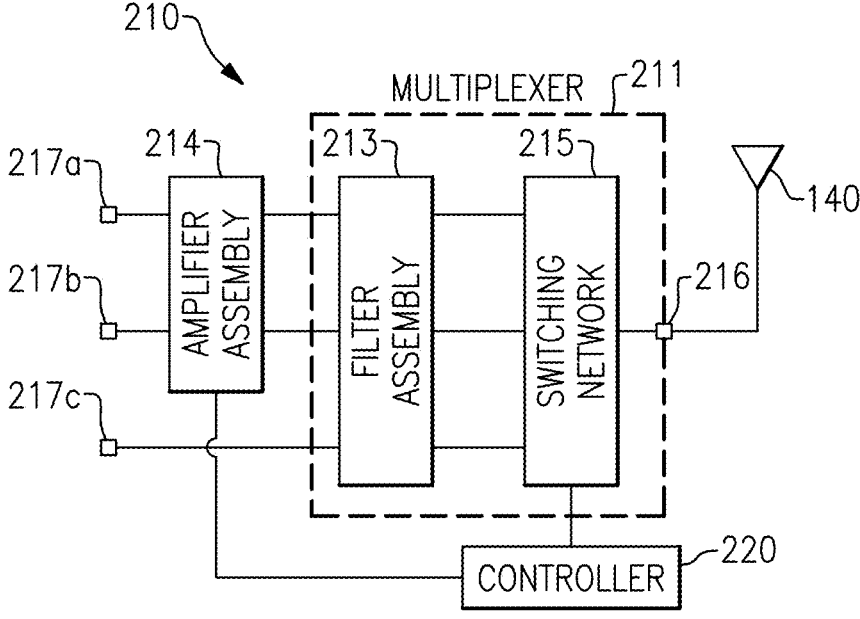
FIG. 2 is a schematic diagram of an example front-end configuration.

FIG. 2 illustrates an example front-end configuration 210, such as a front-end module (FEM), diversity receiver module (DRx), and/or multiple input multiple output (MiMo) module. The front-end configuration 210 includes an antenna 140 configured to receive a radio frequency signal, a multiplexer 211 that includes a switching network 215 and a filter assembly 213, an amplifier assembly 214 and a controller 220 for controlling the amplifier assembly 214 and switching network 215. The front-end configuration 210 may be implemented in a module with multiple paths corresponding to multiple frequency bands and/or different communication protocols.

As illustrated, the multiplexer 211 receives a signal at a signal port 216 and provides up to 3 signals at output ports 217a, 217b, and 217c. The multiplexer 211 is configured to select one or more radio access networks for processing by forming selected signal paths through the switching network 215, and directing signals to designated filters in filter assembly 213 and/or amplifiers in amplifier assembly 214 that are associated with a desired or targeted radio access network. Controller 220 selects the enabled paths through the multiplexer 211.

A filter for an individual signal path through the filter assembly 213 can be designed to a pass a frequency band associated with a particular radio access network. The radio access networks can correspond to cellular frequency bands, examples of which are described in Table 1 above, and/or WLAN frequency bands.

The filter assembly 213 provides filtering for the respective signals provided by the switching network 215. The filter assembly 213 includes at least one filter per signal path through the filter assembly 213 that are disposed along a corresponding one of the plurality of signal paths and configured to act as a bandpass filter for a respective frequency band of the path. For example, a first filter may be configured to filter signals corresponding to the first radio access network, corresponding to a frequency band of a cellular communication standard, while a second filter may be configured to filter signals corresponding to the second radio access network, corresponding to a frequency band of a WLAN communication standard.

The amplifier assembly 214 provides amplification for one or more signals that pass through the assembly. The amplifier assembly 214 includes amplifiers disposed along a corresponding one of the signal paths through the multiplexer, with the amplifiers being configured to amplify a signal received at the amplifier assembly 214. The amplifier assembly 214 and switching network 215 are controllable by the controller 220. For example, in some implementations, each of the amplifiers in the amplifier assembly 214 includes an enable/disable input and is enabled (or disabled) based on an amplifier enable signal received and the enable/disable input. In some implementations, the amplifier enable signal may be transmitted by the controller 220.

Figure 3:
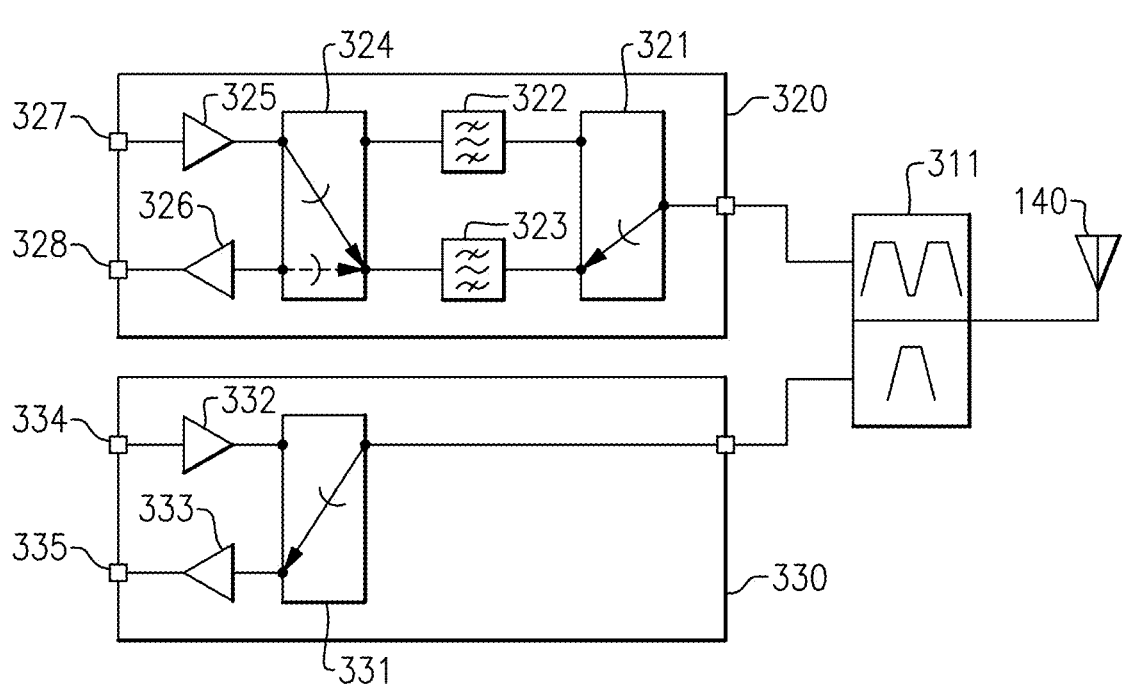
FIG. 3 is a schematic diagram of another example front-end configuration.

FIG. 3 shows an example front-end configuration 300 that includes an antenna 140, multiplexer 311, a cellular module 320, and a Wi-Fi module 330. In the example shown in FIG. 3, the multiplexer is configured to provide signals in a first frequency range to the cellular module 320 and to provide signals in a second frequency range to the Wi-Fi module 330. In one example, the multiplexer 311 provides high band TDD cellular RF signals to the cellular module 320 and 2.4 GHz Wi-Fi signals to the Wi-Fi module 330. As shown in FIG. 3, the multiplexer 311 supports a shared single feed from antenna 140, and the separation of RF signals according to each RAT is achieved by filtering and/or splitting the RF signals by frequency with low loss.

The cellular module 320 comprises a band select switch 321, a first high band filter 322, a second high band filter 323, a transmit/receive (Rx/Tx) select switch 324, a first amplifier 325 (power amplifier), a second amplifier 326 (low noise amplifier), an RF transmit port 327 and an RF receive port 328. In certain implementations, the first high band filter 322 is configured to pass RF band B40 signals such that selecting the first high band filter 322 with the band select switch 321 enables transmission or reception of B40 signals, while a second high band filter 323 is configured to pass RF band B41 signals such that selecting the second high band filter 323 with the band select switch 321 enables transmission or reception of B41 signals.

Figure 4:
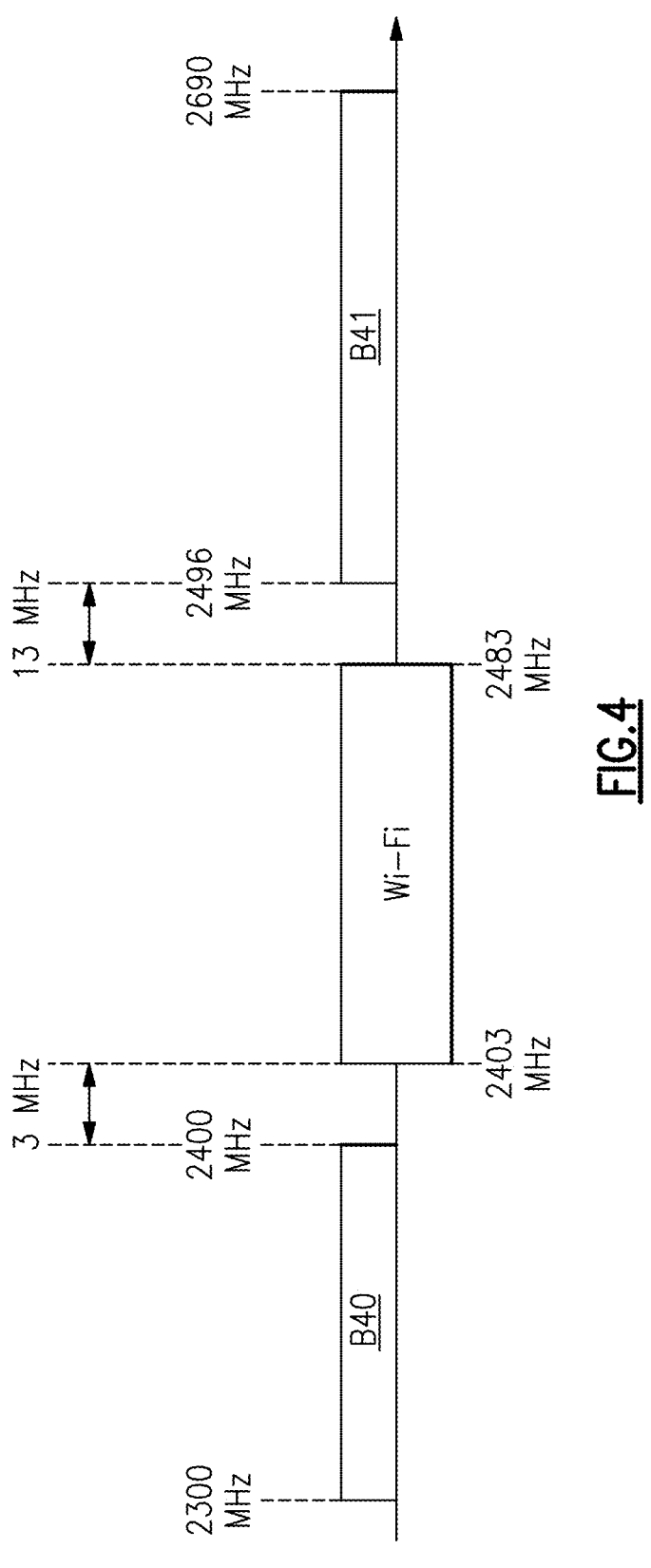
FIG. 4 is a schematic diagram showing example frequency bands for use in wireless communications.

As discussed above, B40 and B41 are commonly used high frequency bands that coexist very close to the 2.4 GHz Wi-Fi band frequency range. FIG. 4 illustrates the relative separation between the 2.4 GHz Wi-Fi band and the conventional B40 and B41 bands. As shown in FIG. 4, the 2.4 GHz Wi-Fi band has a frequency range of 2403 MHz to 2483 MHz, band B40 has a frequency range of 2300 MHz to 2400 MHz, and B41 has a frequency range of 2496 MHz to 2690 MHz. The gap between a lower channel of the Wi-Fi band and an upper channel of Band B40 is 3 MHz, and a gap between an upper channel of the Wi-Fi band and a lower channel of Band B41 is 13 MHz. As shown in FIG. 4, using a band configuration of B40 and B41 with the 2.4 GHz Wi-Fi band results in a relatively small frequency offset gap of 3 MHz and 13 MHz respectively.

It will be appreciated that although the specific examples described herein relate to enabling the consolidation of signal paths for 2.4 GHz Wi-Fi signals and adjacent frequency bands B40 and B41, features of the disclosure are not limited to such examples and may be applied to other Wi-Fi signals and their corresponding adjacent frequency bands. For example, similar principles may be applied when using the 5 GHz Wi-Fi band (ranging from approximately 5.15 GHz to approximately 5.85 GHz) and adjacent frequency band n79 (approximately 4.4 GHz to approximately 5.00 GHz), where the 5 GHz Wi-Fi band is separated from the n79 band by a frequency gap of approximately 15 MHz, or when using the 6 GHz Wi-Fi band (approximately 5.925 GHz to approximately 7.125 GHz) and adjacent frequency band B47 (approximately 5.855 GHz to 5.925 GHz), where there is effectively no frequency gap between the 6 GHz Wi-Fi band and the B47 band.

The Wi-Fi module 330 of FIG. 3 comprises an Rx/Tx select switch 331 (also referred to as a transmit/receive switch), a first amplifier 332 configured to amplify WLAN signals for transmission (e.g., a power amplifier or PA), a second amplifier 333 configured to amplify received WLAN signals (e.g., a low-noise amplifier or LNA). The Wi-Fi module 330 further comprises a WLAN transmit port 334 configured to receive signals for transmission using antenna 140, and a WLAN receive port 335 configured to receive signals that have been received via antenna 140. Accordingly, the front-end configuration 300 can be configured to multiplex multiple cellular signals, extract received WLAN signals, and process WLAN signals for transmission. In some embodiments, the front-end configuration 710 is configured to support simultaneous processing of multiple mid-band and/or high-band cellular frequency bands in conjunction with filtering the WLAN signals.

Thus, the solutions described above employ separate, dedicated paths that are implemented for each RAT through the use of separate hardware in the same front-end architecture to provide bi-directional communication of cellular signals for two separate frequency bands and bi-directional communication of Wi-Fi signals.

FIG. 5 shows a front-end configuration 500 that addresses the above problems by consolidating RF signal paths to provide a combined cellular/Wi-Fi module. The example front-end configuration 500 of FIG. 5 includes an antenna 140, multiplexer 511, and a combined cellular/Wi-Fi module 520. In the example shown in FIG. 5, the multiplexer 511 is configured to provide signals in a first frequency range to a first port 512 of the cellular/Wi-Fi module 520 and to provide signals in a second frequency range to a second port 513 of the cellular/Wi-Fi module 520.

The cellular/Wi-Fi module 520 includes an antenna switch module (ASM) 521 (also referred to herein as an antenna switch), a first high band filter 522, a second high band filter 523, a transmit/receive (Rx/Tx) select switch 524, a shared amplifier network comprising a first amplifier 525 (power amplifier), a second amplifier 526 (low noise amplifier), a transmit port 527, and a receive port 528.

The ASM 521 is configured to select between a first high frequency RF signal band and a second high frequency RF signal band. In certain implementations, a first high band filter 322 is configured to pass RF cellular band B40 signals such that selecting high band filter 322 with the band select switch 321 enables B40 signals to pass through the first signal path, while a second high band filter 323 is configured to pass RF cellular band B41 signals such that selecting high band filter 323 with the band select switch 321 enables B41 signals to pass through the first signal path.

The first amplifier 525 is configured as a power amplifier for amplifying transmission signals that are received from transmission port 527 and provided to the antenna 140, and the second amplifier 526 is configured as an LNA for amplifying received signals from antenna 140 that are provided from the antenna 140 to the receive port 528.

Accordingly, front-end configuration 500 uses circuit components of existing cellular RF paths in a typical smart-phone architecture developed for TDD high frequency bands (such as bands B40 and B41) to process Wi-Fi signals (such as 2.4 GHz Wi-Fi signals). In particular, the amplifiers of the high frequency band TDD cellular path are configured to meet the power levels, linearity, dynamic and timing specs required to process the Wi-Fi signal. In certain implementations, the TDD high frequency bands cover frequency ranges that are substantially the same as, at least partially overlap with, or have a relatively small frequency offset gap with the Wi-Fi carrier frequency range. For example, the cellular frequency range may be separated from the Wi-Fi frequency range by a frequency gap that is smaller than or equal to approximately 15 MHz, 13 MHz or 3 MHz.

Power amplifier 525 is therefore configured for use with both cellular and Wi-Fi signals when the front-end configuration 500 is in transmit mode. Similarly, LNA 526 is reused when the front-end configuration 500 is in receive mode. In re-using existing components of the cellular RF path hardware, the dedicated Wi-Fi module 330 may be eliminated to provide savings on cost and PCB footprint area.

A separate output on the band select switch 524 enables the Wi-Fi path to be routed to the second port 513 of the cellular/Wi-Fi module 520, which is configured to act as a separate, dedicated output pin for Wi-Fi signals. The Wi-Fi signals may then be connected to the antenna multiplexer 511 in a similar manner as described above for FIG. 3.

Although front-end configuration 500 is able to facilitate a reduced PCB footprint area, front-end configuration 500 may be unable to provide uncoordinated simultaneous independent use of both the HB TDD cellular RF path and Wi-Fi RF path at the same time. This usually occurs for the specific instance where a user is placing a voice call and simultaneously accessing data through a Wi-Fi link. In such instances, it is not possible to coordinate the transmission and reception of the cellular and Wi-Fi signals as the cellular base-station and Wi-Fi router operate independently. Therefore, the base-station and Wi-Fi router each act as the master of their respective RAT to determine the separate, and uncoordinated, timing of the transmit and receive signals for each RAT. In such instances where each RAT is uncoordinated, the consolidation of the RF paths in front-end configuration 500 results in one of the signals being prioritized for transmission/reception to at least maintain its communication link while the other signal is blocked, or "blanked", and so suffers from data drop.

However, there are several important instances where a mobile device is able to coordinate the transmission and reception of cellular and Wi-Fi signals. These instances involve the mobile device acting as a Wi-Fi router for other peripheral devices, whereby the mobile device is able to coordinate the timing of its operation as a Wi-Fi router with the timing of cellular transmit/receive signals. In other words, the mobile device is able to control the transmission and reception of cellular and Wi-Fi signals to prevent a cellular signal and a Wi-Fi signal from being transmitted simultaneously and/or to prevent a cellular signal and a Wi-Fi signal from being received simultaneously. Thus, the mobile device prevents both the cellular and Wi-Fi signals from being provided simultaneously to either the low noise amplifier or the power amplifier. Important examples of when a mobile device acts as a Wi-Fi router include "screen mirroring" or content casting, where content is transmitted from the mobile device to a remote display, and when a mobile device acts as a local "Wi-Fi hotspot" for surrounding mobile devices by enabling the sharing of cellular data via a Wi-Fi connection. In these instances, the front-end configuration 500 would still be able to support both RATs at reduced cost and with reduced PCB footprint, provided the transmission and reception of each RAT is coordinated to avoid signal conflict on the shared components or common transmit/receive paths.

Figure 6A:
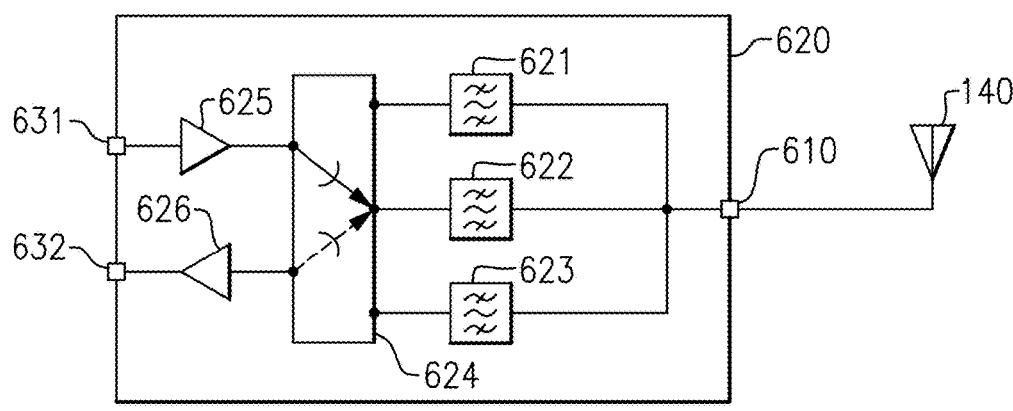
FIG. 6A is a schematic diagram of a front-end configuration according to another embodiment.

It will be appreciated that the front-end configuration 500 shown in FIG. 5 is merely one example of implemented front-end implemented in accordance with the teachings herein. FIG. 6A shows a second example front-end configuration that provides a combined cellular/Wi-Fi module having consolidated RF signal paths.

The example front-end configuration includes an antenna 140, and a combined cellular/Wi-Fi module 620. The front-end configuration provides a common RF receive path, whereby the separate RF signals are separated according to their respective frequencies within the consolidated cellular/Wi-Fi module 620.

In the example shown in FIG. 6A, received signals are provided from the antenna 140 to a shared port 610 of the cellular/Wi-Fi module 620. The cellular/Wi-Fi module 620 comprises a first band pass filter 621, a second band pass filter 622, a third band pass filter 623, a transmit/receive (Rx/Tx) select switch 624, a shared amplifier network including a first amplifier 625 (power amplifier), a second amplifier 626 (low noise amplifier), a transmit port 631 and a receive port 632.

The first band pass filter 621 is configured to pass signals having a first frequency range, for example RF cellular band B40 signals, via a first signal path. The second band pass filter 622 is configured to pass signals having a second frequency range, for example RF cellular band B41 signals, via a second signal path. The third band pass filter 623 is configured to pass signals having a third frequency range, for example 2.4 GHz (Channel 1) Wi-Fi signals, via a third signal path. Once each of the signals has been separated, further circuitry (not shown) may provide signal conditioning and demodulation for the separate cellular and Wi-Fi signals.

As described above for FIG. 5, the first amplifier 625 is configured as a power amplifier for amplifying transmission signals that are received from transmission port 631, and the second amplifier 626 is configured as an LNA for amplifying signals received from shared port 632.

It will be appreciated that the front-ends herein are not limited to the use of three signal paths as shown in FIG. 6A and that more, or fewer, signal paths may be provided.

Figure 6B:
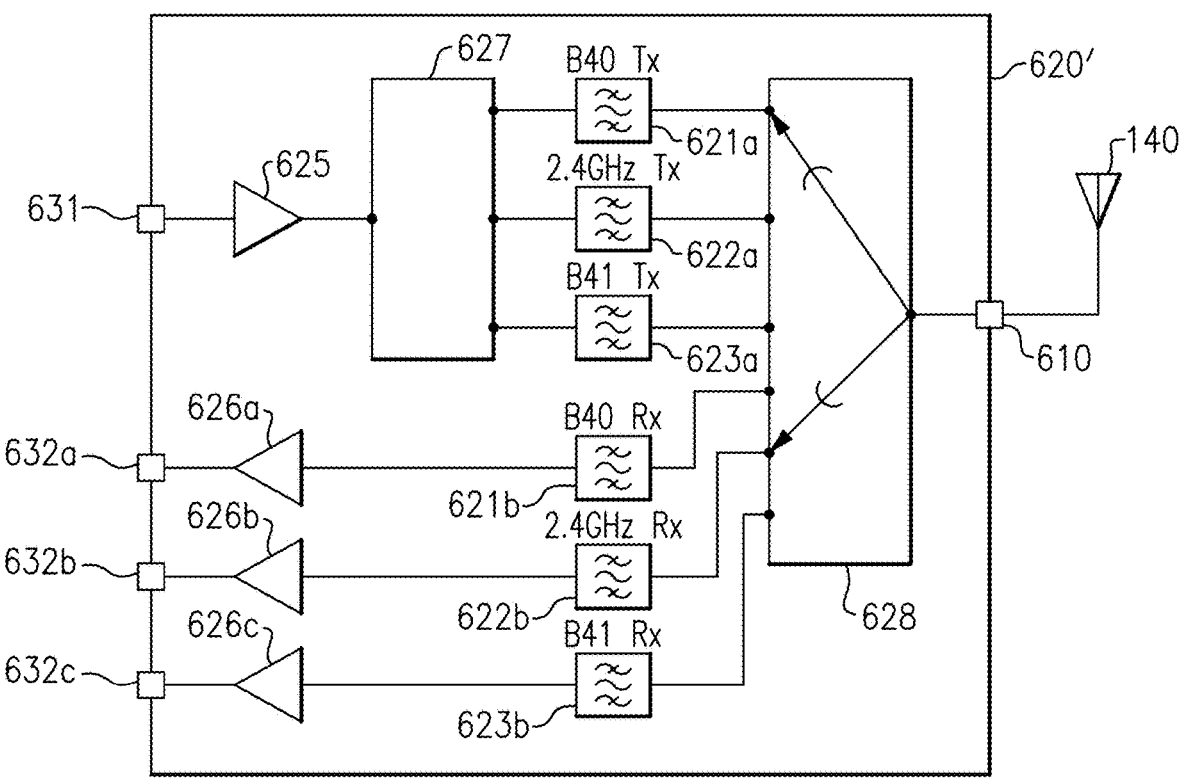
FIG. 6B is a schematic diagram of a front-end configuration according to another embodiment.

FIG. 6B is a schematic diagram of a front-end configuration according to another embodiment. The example front-end configuration includes an antenna 140 and a combined cellular/Wi-Fi module 620'.

The cellular/Wi-Fi module 620' includes a first high band transmit filter 621a (for example, B40 TX), a second high band transmit filter 622a (for example, 2.4 GHz WiFi Tx), a third high band transmit filter 623a (for example, B41 TX), a first high band receive filter 621b (for example, B40 RX), a second high band receive filter 622b (for example, 2.4 GHz WiFi RX), a third high band receive filter 622c (for example, B41 RX), a power amplifier 625, a first LNA 626a, a second LNA 626b, a third LNA 626c, a transmit band selection switch 627, an antenna switch 628, a shared antenna port 610, an RF transmit port 631, a first RF receive port 632a, a second RF receive port 632b, and a third RF receive port 632c.

In the example shown in FIG. 6B, received signals are provided from the antenna 140 to the shared antenna port 610 of the cellular/Wi-Fi module 620'. Thereafter, multi-on switch combining (for example, using the antenna switch 628 capable of connected to one of the Tx filters as well as one of the Rx filters) of the Tx and Rx filters for each frequency band enables TDD operation within a given band.

Accordingly, in comparison to FIG. 6A, the embodiment of FIG. 6B replaces common shared Tx and Rx filters with separate Tx and Rx filters to enable better isolation. For example, isolation can be enhanced for Tx and Rx between the aggressor and victim bands.

Moreover, switch combining of these Tx and Rx filters with the other bands can be performed as Tx and Rx communications are switched back and forth in accordance with TDD operations.

Thus, operation can be considered as asynchronous and utilizes very high isolation between Tx and Rx of different frequency bands. The splitting of Tx and Rx filters relaxes the switch isolation specifications relative to a configuration in which the transmit and receive signals flow through common Tx and Rx filters.

Although shown as including three separate LNAs, in other implementations a broadband switch for the Rx/LNA paths followed by a single broadband LNA can be used instead of the dedicated three LNAs.

Figure 7:
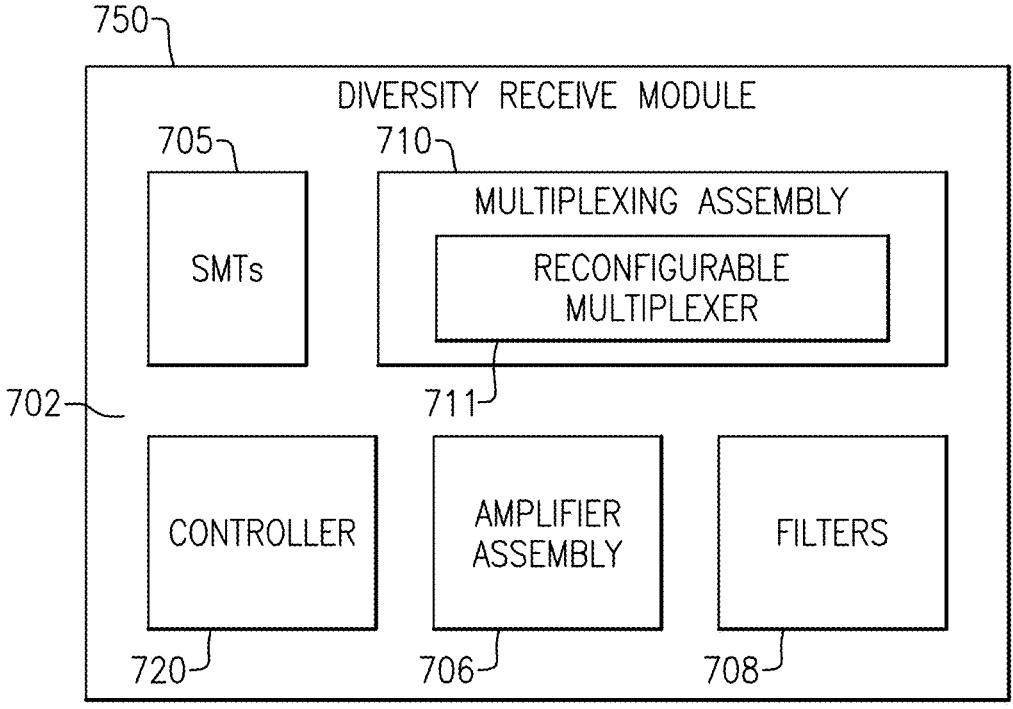
FIG. 7 is a schematic diagram of a diversity receive module according to one embodiment.

FIG. 7 shows that in some embodiments, the front-end configurations described above can be implemented, wholly or partially, in a module. Such a module can be, for example, a front-end module (FEM). Such a module can be, for example, a diversity receiver (DRx) FEM. Such a module can be, for example, a multi-input, multi-output (MiMo) module.

In the example of FIG. 7, a module 750 can include a packaging substrate 702, and a number of components can be mounted on such a packaging substrate 702. For example, a controller 720 (which may include a front-end power management integrated circuit [FE-PIMC]), an amplifier assembly 706 having one or more features as described herein (e.g., power amplifiers, low noise amplifiers, etc.), a multiplexing assembly 710 that includes a reconfigurable multiplexer 711, and a filter bank 708, which may include one or more bandpass filters, can be mounted and/or implemented on and/or within the packaging substrate 702. In some embodiments, the filter bank 708 is implemented as part of the multiplexing assembly 710. Other components, such as a number of surface-mount technology (SMT) devices 705, can also be mounted on the packaging substrate 702. Although all of the various components are depicted as being laid out on the packaging substrate 702, it will be understood that some component(s) can be implemented over other component(s).

Figure 8:
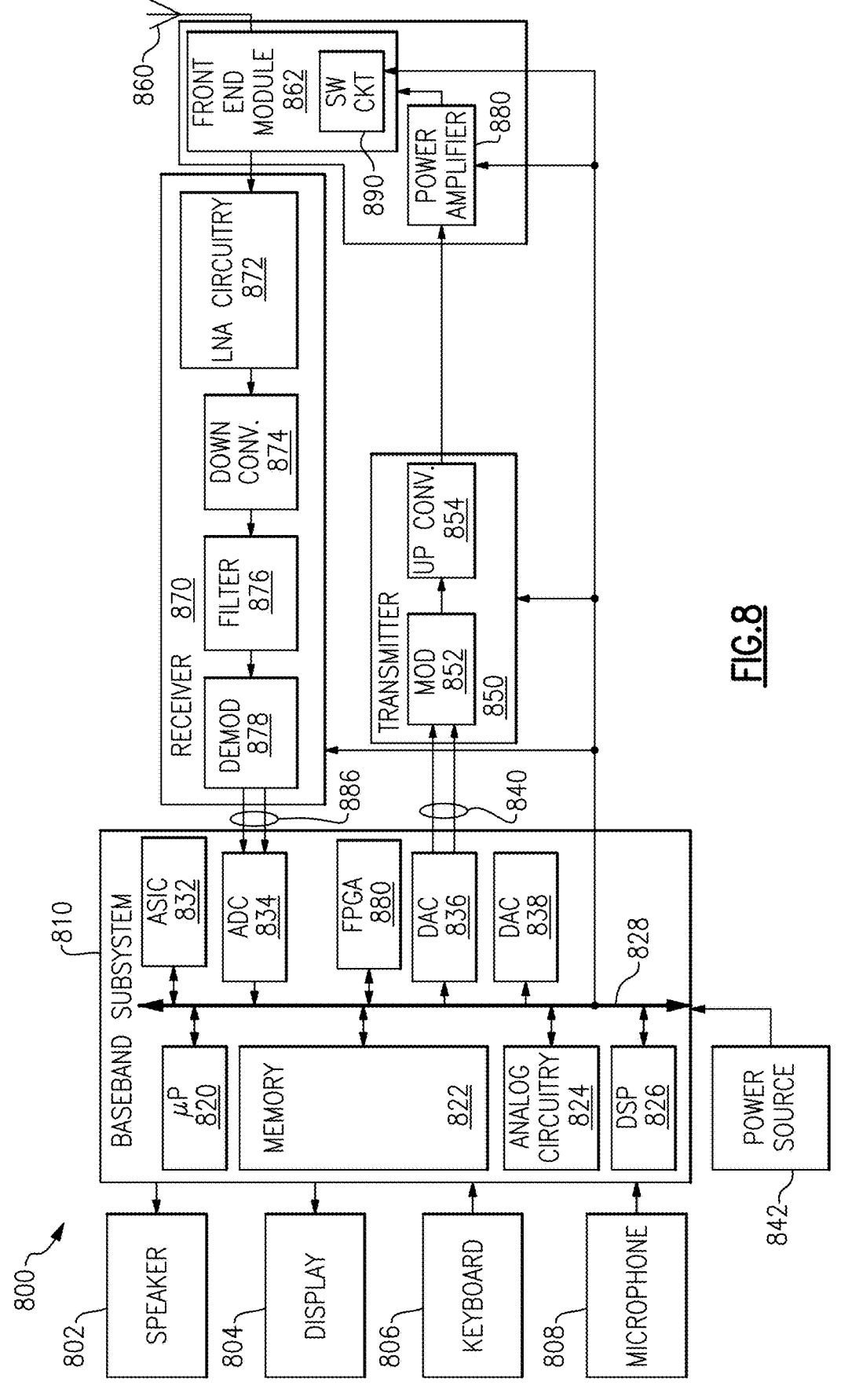
FIG. 8 is a schematic diagram of a wireless device that includes the example diversity receive module of FIG. 7.

FIG. 8 is an exemplary block diagram illustrating a simplified wireless device 800 that includes a combined cellular/Wi-Fi module 500, 600 configured to switch and condition/filter the RF transmit signal and the RF receive signal in order to implement selected frequency band configuration.

The wireless device 800 includes a speaker 802, a display 804, a keyboard 806, and a microphone 808, all connected to a baseband subsystem 810. A power source 842, which may be a direct current (DC) battery or other power source, is also connected to the baseband subsystem 810 to provide power to the wireless device 800. In a particular embodiment, the wireless device 800 can be, for example but not limited to, a portable telecommunication device such as a mobile cellular-type telephone. The speaker 802 and the display 804 receive signals from baseband subsystem 810, as known to those skilled in the art. Similarly, the keyboard 806 and the microphone 808 supply signals to the baseband subsystem 810. The baseband subsystem 810 includes a microprocessor (µP) 820, memory 822, analog circuitry 824, and a digital signal processor (DSP) 826 in communication via bus 828. Bus 828, although shown as a single bus, may be implemented using multiple busses connected as necessary among the subsystems within the baseband subsystem 810. The baseband subsystem 810 may also include one or more of an application specific integrated circuit (ASIC) 832 and a field programmable gate array (FPGA) 830.

The microprocessor 820 and memory 822 provide the signal timing, processing, and storage functions for wireless device 800. The analog circuitry 824 provides the analog processing functions for the signals within baseband subsystem 810. The baseband subsystem 810 provides control signals to a transmitter 850, a receiver 870, a power amplifier 880, and a switching module 890, for example.

It should be noted that, for simplicity, only the basic components of the wireless device 800 are illustrated herein. The control signals provided by the baseband subsystem 810 control the various components within the wireless device 800. Further, the function of the transmitter 850 and the receiver 870 may be integrated into a transceiver.

The baseband subsystem 810 also includes an analog-to-digital converter (ADC) 834 and digital-to-analog converters (DACs) 836 and 838. In this example, the DAC 836 generates in-phase (I) and quadrature-phase (Q) signals 840 that are applied to a modulator 852. The ADC 834, the DAC 836, and the DAC 838 also communicate with the microprocessor 820, the memory 822, the analog circuitry 824, and the DSP 826 via bus 828. The DAC 836 converts the digital communication information within baseband subsystem 810 into an analog signal for transmission to the modulator 852 via connection 840. Connection 840, while shown as two directed arrows, includes the information that is to be transmitted by the transmitter 850 after conversion from the digital domain to the analog domain.

The transmitter 850 includes the modulator 852, which modulates the analog information on connection 840 and provides a modulated signal to upconverter 854. The upconverter 854 transforms the modulated signal to an appropriate transmit frequency and provides the upconverted signal to the power amplifier 880. The power amplifier 880 amplifies the signal to an appropriate power level for the system in which the wireless device 800 is designed to operate.

Details of the modulator 852 and the upconverter 854 have been omitted, as they will be understood by those skilled in the art. For example, the data on connection 840 is generally formatted by the baseband subsystem 810 into in-phase (I) and quadrature (Q) components. The I and Q components may take different forms and be formatted differently depending upon the communication standard being employed.

The power amplifier 880 supplies the amplified signal to a front-end module 862, where the amplified signal may be conditioned and filtered by one or more signal conditioning filters for transmission. In an embodiment, the PA circuitry 808 comprises the power amplifier 880. The RF transmit signal is supplied from the front-end module 862 to the antenna 860. In an embodiment, the antenna 860 comprises an FDD/TDD antenna.

In an embodiment, the front-end module 862 comprises some or all of the front-end configurations 500, 600 described above. In an embodiment, switching module 890 comprises an RF module including a packaging substrate 702 and semiconductor die.

A signal received by antenna 860 will be directed from the front-end module 862 to the receiver 870. The receiver 870 includes low noise amplifier circuitry 872, a downconverter 874, a filter 876, and a demodulator 878.

If implemented using a direct conversion receiver (DCR), the downconverter 874 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 876. The filter 876 comprises a least one filter stage to filter the received downconverted signal as known in the art.

The filtered signal is sent from the filter 876 to the demodulator 878. The demodulator 878 recovers the transmitted analog information and supplies a signal representing this information via connection 886 to the ADC 834. The ADC 834 converts these analog signals to a digital signal at baseband frequency and transfers the signal via bus 828 to the DSP 826 for further processing.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

It is to be appreciated that embodiments of the methods and apparatuses discussed herein are not limited in application to the details of construction and the arrangement of components set forth in the following description or illustrated in the accompanying drawings. The above detailed description of certain embodiments is not intended to be exhaustive or to limit the invention to the precise form disclosed above. The methods and apparatuses are capable of implementation in other embodiments and of being practiced or of being carried out in various ways. Accordingly, the examples of specific implementations provided herein are for illustrative purposes only and are not intended to be limiting. While specific embodiments of, and examples for, the invention are described above for illustrative purposes, various equivalent modifications are possible within the scope of the invention, as those ordinary skilled in the relevant art will recognize in view of the disclosure herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The teachings of the invention provided herein can be applied to other systems, not necessarily the systems described above. The elements and acts of the various embodiments described above can be combined to provide further embodiments.

Some of the embodiments described above have provided examples in connection with mobile devices. However, the principles and advantages of the embodiments can be used for any other systems or apparatus that have needs for power amplifiers with power detection and clamping. Examples of such RF communication systems include, but are not limited to, mobile phones, tablets, base stations, network access points, customer-premises equipment (CPE), laptops, and wearable electronics.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio-frequency front-end configuration comprising:
a first signal path configured to handle a cellular radio-frequency signal;
a second signal path configured to handle a Wi-Fi radio-frequency signal;
a plurality of shared transmit/receive filters including a shared cellular band pass filter and a shared Wi-Fi band pass filter;
a transmit/receive switch;
an antenna;
a shared amplifier network that forms at least part of the first signal path and the second signal path and including a shared power amplifier, the cellular radio-frequency signal being provided from an output of the shared power amplifier to the antenna through the transmit/receive switch and the shared cellular band pass filter, and the Wi-Fi radio-frequency signal being provided from the output of the shared power amplifier to the antenna through the transmit/receive switch and the shared Wi-Fi band pass filter, the shared amplifier network further comprising a shared low noise amplifier having an input connected to the shared cellular band pass filter and the shared Wi-Fi band pass filter through the transmit/receive switch;

an antenna switch connected to the shared cellular band pass filter and the shared Wi-Fi band pass filter; and an antenna multiplexer including a first filter section connected to the antenna switch, the first filter section having a first band pass characteristic passing the cellular radio-frequency signal and a second band pass characteristic spaced apart from the first band pass characteristic and passing the Wi-Fi radio-frequency signal.

2. The radio-frequency front-end configuration of claim 1 further comprising a multiplexer configured to provide the cellular radio-frequency signal from the first signal path to the antenna, and to provide the Wi-Fi radio-frequency signal from the second signal path to the antenna.

3. The radio-frequency front-end configuration of claim 1 further comprising an antenna switch module for selecting between a first radio-frequency band of the cellular radio-frequency signal and a second radio-frequency band of the cellular radio-frequency signal.

4. The radio-frequency front-end configuration of claim 1 wherein the first signal path includes a first band pass filter configured to pass a first cellular radio-frequency band, and the second signal path includes a second band pass filter configured to pass a second cellular radio-frequency band.

5. The radio-frequency front-end configuration of claim 1 wherein the cellular frequency range is separated from the Wi-Fi frequency range by a frequency gap that is smaller than 15 MHz.

6. The radio-frequency front-end configuration of claim 1 wherein the cellular radio-frequency signal includes frequencies between 2300 MHz to 2400 MHz and between 2496 MHz to 2690 MHz and the Wi-Fi radio-frequency signal includes frequencies between 2403 MHz to 2483 MHz.

7. The radio-frequency front-end configuration of claim 1 wherein the cellular radio-frequency signal includes frequencies between 4400 MHz to 5000 MHz and the Wi-Fi radio-frequency signal includes frequencies between 5150 MHz to 5850 MHz.

8. The radio-frequency front-end configuration of claim 1 wherein the cellular radio-frequency signal includes frequencies between 5855 MHz to 5925 MHz and the Wi-Fi radio-frequency signal includes frequencies between 5925 MHz to 7125 MHz.

9. The radio-frequency front-end configuration of claim 1 wherein the first signal path includes a first filter configured to pass frequencies between 2300 MHz to 2400 MHz and a second filter configured to pass frequencies between 2496 MHz to 2690 MHz.

10. The radio-frequency front-end configuration of claim 1 wherein the transmit/receive switch selects either the input of the shared low noise amplifier, a bypass path to the antenna, or the output of the shared power amplifier.

11. The radio-frequency front-end configuration of claim 1 wherein the further comprising an antenna switch connected to the shared cellular band pass filter and the shared Wi-Fi band pass filter, and an antenna multiplexer further includes including a first filter section connected to the antenna switch and a second filter section directly connected to the transmit/receive switch.

12. A wireless device comprising:

one or more antennas including a first antenna; and a radio-frequency module coupled to the one or more antennas, the radio-frequency module including a front-end configuration including a first signal path configured to handle a cellular radio-frequency signal, a second signal path configured to handle a Wi-Fi radio-frequency signal, a plurality of shared transmit/receive filters including a shared cellular band pass filter and a shared Wi-Fi band pass filter, a transmit/receive switch, and a shared amplifier network that forms at least part of the first signal path and the second signal path, the shared amplifier network including a shared low noise amplifier and a shared power amplifier, the cellular radio-frequency signal being provided from an output of the shared power amplifier to the first antenna through the transmit/receive switch and the shared cellular band pass filter, and the Wi-Fi radio-frequency signal being provided from the output of the shared power amplifier to the first antenna through the transmit/receive switch and the shared Wi-Fi band pass filter, an input of the shared low noise amplifier connected to the shared cellular band pass filter and the shared Wi-Fi band pass filter through the transmit/receive switch, the radio-frequency module further including an antenna switch connected to the shared cellular band pass filter and the shared Wi-Fi band pass filter and an antenna multiplexer including a first filter section connected to the antenna switch, the first filter section having a first band pass characteristic passing the cellular radio-frequency signal and a second band pass characteristic spaced apart from the first band pass characteristic and passing the Wi-Fi radio-frequency signal.

13. The wireless device of claim 12 wherein the radio-frequency module further includes a multiplexer configured to provide the cellular radio-frequency signal from the first signal path to the first antenna, and to provide the Wi-Fi radio-frequency signal from the second signal path to the first antenna.

14. The wireless device of claim 12 wherein the radio-frequency module further includes an antenna switch module for selecting between a first radio-frequency band of the cellular radio-frequency signal and a second radio-frequency band of the cellular radio-frequency signal.

15. The wireless device of claim 12 wherein the radio-frequency module further an antenna switch connected to the shared cellular band pass filter and the shared Wi-Fi band pass filter, and an antenna multiplexer further includes including a first filter section connected to the antenna switch and a second filter section directly connected to the transmit/receive switch.

16. A method of coordinating the transmission and reception of signals, the method comprising:

handling a cellular radio-frequency signal using a first signal path;

handling a Wi-Fi radio-frequency signal using a second signal path;

amplifying both the cellular radio-frequency signal and the Wi-Fi radio-frequency signal for transmission on an antenna using a shared power amplifier of a shared amplifier network that forms at least part of the first signal path and the second signal path, the cellular radio-frequency signal being provided from an output of the shared power amplifier to the antenna through a transmit/receive switch and a shared cellular band pass filter, and the Wi-Fi radio-frequency signal being provided from the output of the shared power amplifier to the antenna through a shared Wi-Fi band pass filter, an input of a shared low noise amplifier connected to the shared cellular band pass filter and the shared Wi-Fi band pass filter through the transmit/receive switch;

using an antenna switch to connect the antenna to the shared cellular band pass filter or the shared Wi-Fi band pass filter through a first filter section of an antenna multiplexer, the first filter section having a first band pass characteristic passing the cellular radio-frequency signal and a second band pass characteristic spaced apart from the first band pass characteristic and passing the Wi-Fi radio-frequency signal.

17. The method of claim 16 wherein further comprising using an antenna switch to connect the antenna to the shared cellular band pass filter or the shared Wi-Fi band pass filter through a first filter section of an antenna multiplexer, the antenna multiplexer further includes including a second filter section directly connected to the transmit/receive switch.

\*   \*   \*   \*   \*